United States Patent [19]

Grimsley et al.

[11] Patent Number: 4,604,529
[45] Date of Patent: Aug. 5, 1986

[54] RADAR WARNING RECEIVER WITH POWER PLUG

[75] Inventors: Richrd L. Grimsley, Cincinnati; Gregory R. Furnish, Mason, both of Ohio

[73] Assignee: Cincinnati Microwave, Inc., Cincinnnati, Ohio

[21] Appl. No.: 656,157

[22] Filed: Sep. 28, 1984

[51] Int. Cl.$^4$ .................. H02J 1/00; H01R 3/00
[52] U.S. Cl. .................... 307/10 R; 307/9; 307/150; 307/151; 339/154 A; 339/176 R; 339/147 P
[58] Field of Search .............. 307/10 R, 9, 150, 151; 339/150 R, 147 R, 147 P, 154 A, 154 L, 176 R, 176 P, 197 R, 197 P, 198 P, 183, 188 R, 195 R, 198 R, 206 P, 217 PS, 255, 267; 320/2; 361/392, 393

[56] References Cited

U.S. PATENT DOCUMENTS

| | | | |
|---|---|---|---|
| 966,139 | 8/1910 | Thordarson . | |
| 1,515,866 | 11/1924 | Marten . | |
| 1,564,950 | 12/1925 | Curran . | |
| 1,883,993 | 11/1932 | Flaherty . | |
| 2,247,753 | 7/1941 | Hansell | 175/366 |
| 2,579,141 | 12/1951 | Eckert, Jr. et al. | 175/298 |
| 2,809,004 | 10/1957 | Kaufman et al. | 248/300 |
| 2,933,655 | 4/1960 | Gradisar et al. | 317/100 |
| 2,940,017 | 6/1960 | Murphy et al. | 317/100 |
| 2,954,544 | 9/1960 | Focosi | 339/182 |
| 2,964,621 | 12/1960 | Foltyn | 250/16 |
| 2,984,774 | 5/1961 | Race | 317/234 |
| 3,001,102 | 9/1961 | Stiefel et al. | 317/99 |
| 3,013,745 | 12/1961 | Galway et al. | 244/14 |
| 3,045,203 | 7/1962 | David | 339/208 X |
| 3,065,384 | 11/1962 | Sprude | 317/100 |
| 3,099,505 | 7/1963 | Schwartz | 339/45 |
| 3,201,654 | 8/1965 | Clark et al. | 317/100 |
| 3,217,793 | 11/1965 | Coe | 165/80 |
| 3,219,885 | 11/1965 | Schniers | 317/100 |
| 3,236,296 | 2/1966 | Dubin | 165/80 |
| 3,288,301 | 11/1966 | Kent et al. | 211/41 |
| 3,309,598 | 3/1967 | Montgomery et al. | 339/182 R X |
| 3,348,148 | 10/1967 | Parsons et al. | 325/15 |
| 3,355,540 | 11/1967 | Newell | 174/15 |
| 3,377,610 | 4/1963 | Busch et al. | 339/95 |
| 3,382,414 | 5/1968 | Borner | 317/101 |
| 3,390,373 | 6/1968 | Ruston . | |
| 3,412,225 | 11/1968 | Rogers et al. | 200/168 |
| 3,436,603 | 4/1969 | Vogt | 317/100 |
| 3,439,255 | 4/1969 | Carnes et al. | 322/28 |
| 3,462,553 | 8/1969 | Spranger | 179/1 |
| 3,467,891 | 9/1969 | Mogle | 317/101 |
| 3,467,892 | 9/1969 | Sprude et al. | 317/117 |
| 3,467,892 | 9/1969 | Sprude et al. | 317/117 |
| 3,476,981 | 11/1969 | Burton et al. | 317/100 |
| 3,476,981 | 11/1969 | Burton et al. | 317/100 |

(List continued on next page.)

FOREIGN PATENT DOCUMENTS

| | | |
|---|---|---|
| 1007275 | 3/1977 | Canada . |
| 2050837 | 4/1972 | Fed. Rep. of Germany . |
| 2638257 | 10/1977 | Fed. Rep. of Germany . |
| 1348200 | 11/1963 | France . |
| 1436252 | 5/1976 | United Kingdom . |
| 1587856 | 4/1981 | United Kingdom . |

OTHER PUBLICATIONS

Irwin N. Schuster, "8 More Printed-Circuit Guides", *Product Engineering*, Jun. 19, 1963.

*Primary Examiner*—William M. Shoop, Jr.
*Assistant Examiner*—Shik Luen Paul Ip
*Attorney, Agent, or Firm*—Wood, Herron & Evans

[57] ABSTRACT

A radar warning receiver is provided including a plug adapted to be received within a vehicle cigarette lighter socket, wherein the plug incorporates a metal plate having (1) a foward end to which is provided a pair of outwardly bowed resilient spring arms which extend exteriorly of the plug to make electrical, physical and thermally conductive contact with the vehicle cigarette lighter socket and, (2) mounted thereto a power regulating device. The thermally conductive contact permits reduction in the size of the gripping end of the plug. Accordingly, the gripping end of the plug is sized to be conveniently gripped between the thumb and fingers of a human hand.

12 Claims, 4 Drawing Figures

U.S. PATENT DOCUMENTS

| Patent No. | Date | Inventor | Class |
|---|---|---|---|
| 3,499,988 | 3/1970 | Watanabe et al. | 179/1 |
| 3,515,936 | 6/1970 | Wetter | |
| 3,519,889 | 7/1970 | Monaco | 317/100 |
| 3,519,889 | 7/1970 | Monaco | 317/100 |
| 3,567,998 | 3/1971 | Ammerman | 317/101 |
| 3,567,998 | 3/1971 | Ammerman | 317/101 |
| 3,582,762 | 6/1971 | Mori et al. | 322/28 |
| 3,611,046 | 10/1971 | Covert | 317/100 |
| 3,611,046 | 10/1971 | Covert | 317/100 |
| 3,638,073 | 1/1972 | Bernstein | 317/100 |
| 3,638,073 | 1/1972 | Bernstein | 317/100 |
| 3,641,395 | 2/1972 | Nation | 317/117 |
| 3,641,395 | 2/1972 | Nation | 317/117 |
| 3,656,058 | 4/1972 | Leathers | 324/158 F |
| 3,656,058 | 4/1972 | Leathers | 324/158 F |
| 3,665,250 | 5/1972 | Bales et al. | 317/16 |
| 3,674,961 | 7/1972 | Wright, Jr. | 200/168 C |
| 3,689,804 | 9/1972 | Ishihama et al. | 317/100 |
| 3,793,563 | 2/1974 | Brefka | 317/107 |
| 3,852,643 | 12/1974 | Seki et al. | |
| 3,859,570 | 1/1975 | Veranth et al. | 317/100 |
| 3,865,463 | 2/1975 | Busch | 339/176 R |
| 3,883,834 | 5/1975 | Osteen | 336/61 |
| 3,925,809 | 12/1975 | Striker | 357/81 |
| 3,940,665 | 2/1976 | Seki | 317/100 |
| 4,047,242 | 9/1977 | Jakob et al. | 361/389 |
| 4,054,352 | 10/1977 | Rudin | 339/154 A |
| 4,072,378 | 2/1978 | Lockbrunner et al. | 339/17 C |
| 4,092,698 | 5/1978 | Brefka | 361/399 |
| 4,160,992 | 7/1979 | Adlerstein | 357/81 |
| 4,196,393 | 4/1980 | Schweitzer | 340/600 |
| 4,204,248 | 5/1980 | Proffit et al. | 361/388 |
| 4,205,367 | 5/1980 | Arnold, III | 362/95 X |
| 4,248,494 | 2/1981 | McDonald et al. | 339/154 A |
| 4,259,685 | 5/1981 | Romano | 357/81 |
| 4,322,122 | 3/1982 | Schwartz et al. | 339/197 R |
| 4,325,107 | 4/1982 | MacLeod | 362/183 |
| 4,378,503 | 3/1983 | Rautiola | 307/10 R |
| 4,398,231 | 8/1983 | Currence | 361/23 |
| 4,409,641 | 10/1983 | Jakob et al. | 361/386 |
| 4,420,767 | 12/1983 | Hodge et al. | 357/81 |

RADAR WARNING RECEIVER WITH POWER PLUG

The present invention relates to vehicle-mounted police radar warning receivers and more particularly to such receivers which are powered by power regulating devices not housed within the radar warning receiver housing.

By way of background, a police radar warning receiver is an electronic assembly mountable in a vehicle, such as a passenger car or truck, motorcycle, boat or the like, which travels on land or water in areas subject to speed-monitoring radar surveillance by police, and functions to detect the presence of the police radar and provide the driver or user with an audible and/or visual indication that his speed is being checked by radar. Typically, the entire operating circuitry and the antenna are mounted within a box-shaped housing which is placed on the dashboard of the vehicle. The front of the housing faces the driver and has indicators and control knobs. Extending from the rear of the housing is a power cord terminating in a plug which is appropriately configured to be received into the vehicle's cigarette lighter socket. The plug transmits electrical energy from the vehicle's electrical system through the cigarette lighter socket to the receiver via the power cord.

The current which flows in the vehicle's electrical system is prone to frequent and drastic fluctuations. Voltage may also fluctuate. Some fluctuations are severe enough to damage the operating circuitry of radar warning receivers. To protect the circuitry, vehicle-mounted radar warning receivers are provided with power regulating devices which isolate the receiver circuitry from the impact of the fluctuations. The power regulating devices are typically mounted within, or on-board, the radar warning receiver housing such as was done with the ESCORT radar warning receiver marketed by Cincinnati Microwave, Inc. of Cincinnati, Ohio, the assignee herein.

Power regulating devices generate a great deal of thermal energy, or heat. To avoid damage to the power regulating device, the receiver circuitry, or both, caused by overheating, sufficient heat must be dissipated to effectively cool the power regulating devices.

Radar warning receivers rely on passive cooling, i.e., no fans or the like are used. Instead, cooling is accomplished via convection through the ambient air of the vehicle passenger compartment. If there is insufficient air space around the power regulating device, or the housing is too small to provide enough surface area to allow sufficient heat dissipation, the device may overheat.

When the housing is too small to allow sufficient passive cooling, either active cooling must be employed or the power regulating device must be located outside, or off-board, the receiver.

Prior efforts to make off-board power regulating devices for electronic equipment powered by a vehicle electrical system through the cigarette lighter socket have employed plugs with very large, bulky handle portions. The power regulating device is mounted in the handle portion which extends away from the lighter socket well into the passenger compartment. These handle portions are large enough that they must be gripped with the whole hand to remove or insert the plug, rather than just simply between the thumb and fingers. Such large handle portions provide sufficient surface area for cooling of the power regulating device through convection currents with the passenger compartment's ambient air. One drawback, however, is that the handle extends into the passenger compartment far enough to be an annoyance and to get in the way of passengers. Further, because the large handle portion projects into the passenger compartment, it may be more easily damaged if someone's knee hits it, for example. Finally, the large handle portion is a potential source of injury should any part of a passenger's body impact the handle with enough force.

Accordingly, an objective of the invention has been to provide a passively cooled power regulating device for a radar warning receiver which does not rely solely on convection cooling by the ambient air of the vehicle's passenger compartment for cooling.

A further object of the present invention has been to reduce the handle portion of plugs adapted to be received in a vehicle cigarette lighter socket and which contain a power regulating device.

These and other objects of the present invention have been achieved by providing a radar warning receiver including such a plug, wherein the plug incorporates a metal plate having (1) a forward end to which is provided a pair of outwardly bowed resilient spring arms which extend exteriorly of the plug to make electrical, physical and thermally conductive contact with the vehicle cigarette lighter socket and, (2) mounted thereto a power regulating device. By reason of the thermally conductive contact with the socket, heat is dissipated to the socket from the plug thereby minimizing the amount of heat which must be dissipated by convection. Hence, the gripping end can be reduced in size so as to be conveniently gripped between the thumb and fingers of a human hand.

Power regulating devices typically include an active, heat generating integrated circuit (IC) as well as some passive components. In the preferred embodiment of the present invention, the IC electrically and thermally conductively communicates with the metal plate and also electrically communicates with a circuit board containing the passive regulator components.

To mount the printed circuit board, the metal plate is provided with a pair of confronting upturned support walls formed along opposite sides of the rearward end of the plate and at either side of the IC. Preferably, each support wall is trifurcated having two outer fingers forming a ledge upon which the printed circuit board rests and having a center finger which applies pressure to the edge and top of the printed circuit board to force the board downwardly against the ledge and sidewardly against the opposite support wall.

The several objectives and features of the present invention will become more readily apparent from the following detailed description taken with the accompanying drawings wherein like reference numerals apply to like structure and in which.

Figure 1:
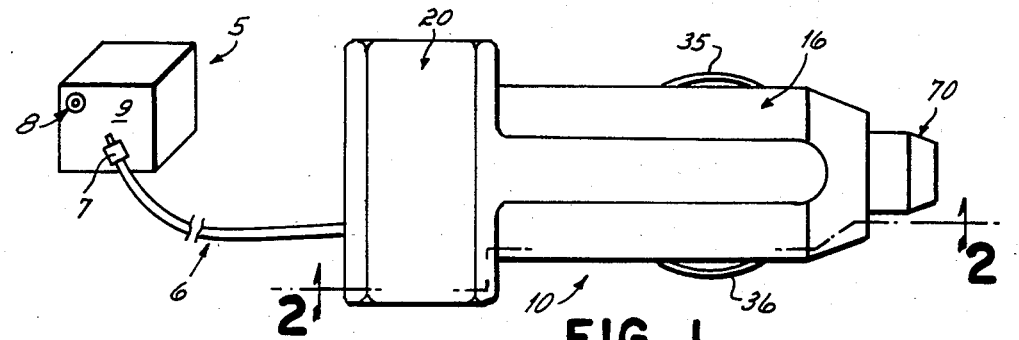
FIG. 1 is a schematic representation of a preferred embodiment of the radar warning receiver of the present invention.

With reference to FIG. 1, there is shown a plug 10 which is adapted to be received within a vehicle's cigarette lighter socket (not shown). The plug 10 communicates electrically with a radar warning receiver 5 via power cord 6. Power cord 6 includes a plug 7 adapted to be received in a jack 8 in the rear panel 9 of receiver 5. Typical of receiver 5 is the compact police radar warning receiver disclosed in concurrently filed U.S. patent application Ser. No. 656,026, entitled "Police Radar Warning Receiver," invented by John R. Fende, Gregory R. Furnish and Richard L. Grimsley, assigned to Cincinnati Microwave, Inc., the disclosure of which is incorporated herein by reference.

Figure 2:
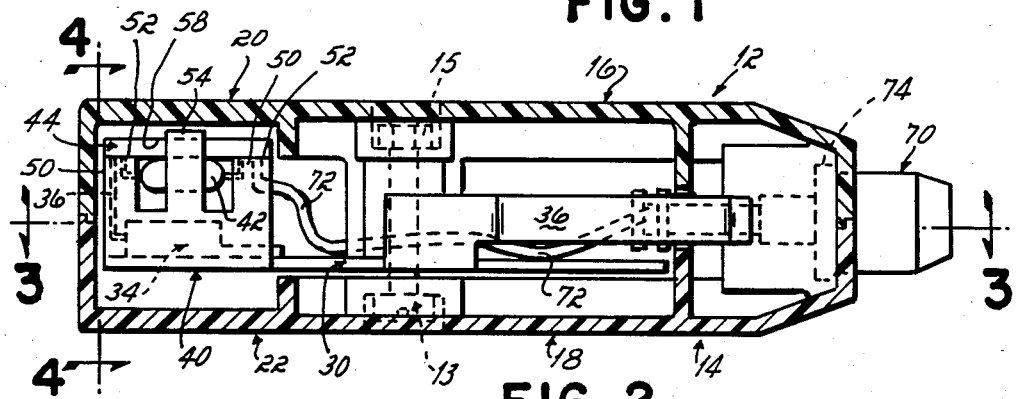
FIG. 2 is a right side cutaway view along line 2—2 of FIG. 1 of the power plug of FIG. 1.
Figure 3:
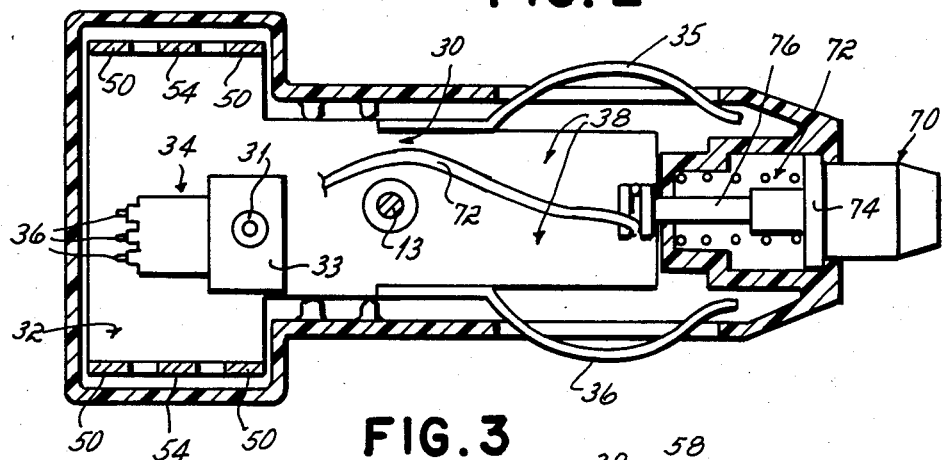
FIG. 3 is a top view of the plug of FIG. 2 taken along line 3—3.

With reference to FIGS. 2 and 3, plug 10 is comprised of plastic housing sections 12, 14 held together by screw 13 and nut 15. Housing sections 12, 14 have forward tubular ends 16, 18, the combined circumference of which is sized to permit the ends 16, 18 to be slidably received in a vehicle's cigarette lighter socket (not shown). Housing sections 12, 14 are also provided with rectangular grip ends 20, 22 which comprise a box-shaped gripping end sized to be easily and conveniently gripped between the user's fingers and thumb (not shown) for insertion and removal of plug 10 from the cigarette lighter socket (not shown).

Contained substantially within plastic housing sections 12, 14 is an elongated metal plate 30. Mounted in electrical and thermally conductive contact with the rearward end 32 of plate 30 is an active regulator integrated circuit (IC) 34. Electrically conductive back wall 33 of IC 34 is secured to plate 30 by a rivet 31. IC 34 may be any standard voltage or current regulator, typically the former, as is appropriate to power receiver 5. Rearward end 32 is contained within grip sections 20, 22.

IC 34 operates in conjunction with appropriate passive circuit elements 42 via the leads 36 of IC 34 to regulate the power available from a vehicle electrical system (not shown) to provide on cord 6 a predetermined voltage over a preselected range of current, or, alternatively, a predetermined current over a range of voltage, as is well understood.

At the forward end 38 of plate 30 are integrally formed a pair of outwardly bowed resilient spring arms 35, 36. Forward end 38 is contained within tubular ends 16, 18 and arms 35, 36 extend exteriorly and on opposite sides thereof.

Arms 35, 36 are adapted to releasably retain tubular ends 16, 18 within the vehicle's cigarette lighter socket (not shown). Also, the arms provide an electric path (typically the vehicle ground) between the vehicle's electrical system (not shown) and plate 30 and, thus, IC 34.

IC 34 is not only a source of electrical power but is also a source of thermal energy. By mounting IC 34 in electrical and thermally conductive contact with plate 30, not only is electrical energy provided to IC 34, as mentioned, but heat can be caused to flow away from IC 34. To that end, arms 35, 36 perform a third function by providing a thermally conductive path between the vehicle (not shown) and the IC 34, thereby causing the vehicle (not shown) to become a heat sink for the IC 34. In that manner, heat is drawn into the chassis of the vehicle (not shown) and then dispersed throughout the ambient air environment in which the car travels. IC 34 is thus cooled by conductively dissipating heat into the socket and thus to the chassis of the vehicle rather than solely be convection through the ambient air within the passenger compartment (not shown) of the vehicle. Hence, the vehicle becomes a heat sink for IC 34.

Passive circuit elements 42 are mounted to a printed circuit board 44. Leads 36 are bent as in FIG. 2 to make electrical contact with elements 42 on board 44 to thus place elements 42 in operative electrical contact with IC 34.

Figure 4:
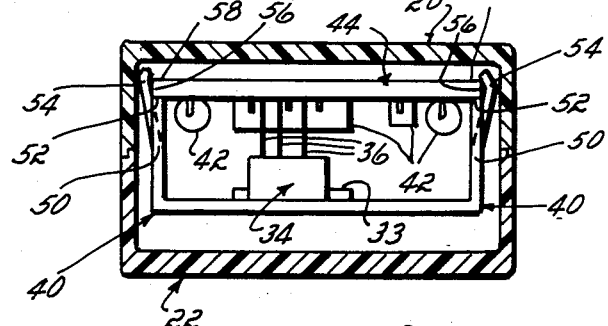
FIG. 4 is a rear view of the plug of FIG. 2 taken along line 4—4.

To mount board 44 within grip ends 20, 22, rearward end 32 of plate 30 is provided with a pair of confronting upturned support walls 40, 40 formed along opposite sides thereof and on either side of the IC 34. (See FIG. 4.) Each support wall 40 is trifurcated having two outer fingers 50, 50 and a center finger 54. Outer fingers 50, 50 cooperate to form a ledge 52 upon which the printed circuit board 44 rests. Center finger 54 applies pressure to the edge 56 and top 58 of printed circuit board 44 to force it downwardly against ledge 52 and sidewardly against the opposite support wall.

Plug 10 also contains a forward contact post 70 which provides an electrical interconnection to the vehicle's electrical system (typically, the positive supply line or the positive terminal of the vehicle battery (not shown)). Post 70 is also electrically connected to regulator 34 via wire 72 and board 44.

Post 70 is urged forwardly by resilient spring 72 and is held within housing sections 12, 14 by flanged lip 74. Spring 72 is mounted around rod 76 secured within housing sections 12, 14. When inserted into a vehicle cigarette lighter socket (not shown), post 70 will contact a mating terminal therein and be urged against that terminal to maintain electrical contact.

With the foregoing plug 10, an off-board power regulating device is provided for a radar warning receiver without the bulky plugs previously used to power electrical apparatus from vehicle cigarette lighter sockets. Further, because heat can be dissipated through the vehicle chassis rather than the passenger compartment, grip ends 20, 22 need be no bigger than is necessary to physically hold therein the power regulating components which are typically quite small and to permit a user (not shown) to grip plug 10 to insert it into or remove it from the cigarette lighter socket.

Having described the invention, what is claimed is:

1. In combination:
   a radar warning receiver;
   a plug adapted to be received within a vehicle cigarette lighter socket;
   a power cord interconnecting said radar warning receiver and said plug;
   said plug comprising a plastic housing having a forward tubular end the circumference of which is sized to permit said tubular end to be slidably received in said vehicle cigarette lighter socket and further having a rearward handle grip end sized to conveniently be gripped between the thumb and fingers of a human hand;
   an elongated metal plate having a forward end being contained substantially within said housing tubular end;
   a pair of outwardly bowed resilient spring arms formed integral to the forward end of said plate, said arms projecting exteriorly of said forward tubular end of said housing;
   power regulator means being a source of thermal energy and mounted in electrical and thermally conductive contact with said plate for providing regulated energy to said radar warning receiver via said power cord from the vehicle electrical system when said plug is received in said vehicle cigarette lighter socket;

said arms (1) being adapted to releasably retain said tubular end in said socket, (2) providing an electrical path between said vehicle electrical system and said power regulator means, and (3) providing a thermally conductive path between said vehicle and said power regulator means whereby said vehicle becomes a heat sink for said power regulator means.

2. The combination of claim 1, said power regulator means comprising:

an integrated circuit means electrically and thermally conductively communicating with said metal plate and being said source of thermal energy;

passive circuit means being in operative electrical contact with said integrated circuit means;

a circuit board to which said passive circuit means are mounted;

said plug further including a pair of confronting upturned support walls formed along opposite sides said plate and at either side of said integrated circuit means;

said circuit board being supported by said support walls.

3. The combination of claim 2, wherein each said support wall is trifurcated having two outer fingers cooperating to form a ledge upon which said circuit board rests and having a center finger disposed between said two outer fingers, said center finger applying pressure to the edge and top of said circuit board to force said board downwardly against said ledge and sidewardly against said opposite support wall.

4. The combination of claim 1, said metal plate further having a rearward end being contained substantially within said housing grip end, said power regulating means being mounted to said metal plate rearward end.

5. The combination of claim 4, said power regulator means comprising:

an integrated circuit means electrically and thermally conductively communicating with said metal plate and being said source of thermal energy;

passive circuit means being in operative electrical contact with said integrated circuit means;

a circuit board to which said passive circuit means are mounted;

said plug further including a pair of confronting upturned support walls formed along opposite sides of said rearward end of said plate and at either side of said integrated circuit means;

said circuit board being supported by said support walls.

6. The combination of claim 5, wherein each said support wall is trifurcated having two outer fingers cooperating to form a ledge upon which said circuit board rests and having a center finger disposed between said two outer fingers, said center finger applying pressure to the edge and top of said circuit board to force said board downwardly against said ledge and sidewardly against said opposite support wall.

7. A power plug adapted to be received within a vehicle cigarette lighter socket for supplying energy from a vehicle electrical system to a radar warning receiver, the plug comprising:

a plastic housing having a forward tubular end the circumference of which is sized to permit said tubular end to be slidably received in the vehicle cigarette lighter socket and further having a rearward handle grip end sized to conveniently be gripped between the thumb and fingers of a human hand;

an elongated metal plate having a forward end being contained substantially within said housing tubular end;

a pair of outwardly bowed resilient spring arms formed integral to the forward end of said plate, said arms projecting exteriorly of said forward tubular end of said housing;

power regulator means being a source of thermal energy and mounted in electrical and thermally conductive contact with said plate for providing regulated energy to the radar warning receiver from the vehicle electrical system through said socket;

said arms (1) being adapted to releasably retain said tubular end in said socket, (2) providing an electrical path between said vehicle electrical system and said power regulator means, and (3) providing a thermally conductive path between said vehicle and said power regulator means whereby said vehicle becomes a heat sink for said power regulator means.

8. The power plug of claim 7, said power regulator means comprising:

integrated circuit means electrically and thermally conductively communicating with said metal plate and being said source of thermal energy;

passive circuit means being in operative electrical contact with said integrated circuit means;

a circuit board to which said passive circuit means are mounted;

said plug further including a pair of confronting upturned support walls formed along opposite sides of said plate and at either side of said integrated circuit means;

said circuit board being supported by said support walls.

9. The power plug of claim 8, wherein each said support wall is trifurcated having two outer fingers cooperating to form a ledge upon which said circuit board rests and having a center finger disposed between said two outer fingers, said center finger applying pressure to the edge and top of said circuit board to force said board downwardly against said ledge and sidewardly against said opposite support wall.

10. The power plug of claim 7, said metal plate further having a rearward end being contained substantially within said housing grip end, said power regulating means being mounted to said metal plate rearward end.

11. The power plug of claim 10, said power regulator means comprising:

integrated circuit means electrically and thermally conductively communicating with said metal plate and being said source of thermal energy;

passive circuit means being in operative electrical contact with said integrated circuit means;

a circuit board to which said passive circuit means are mounted;

said plug further including a pair of confronting upturned support walls formed along opposite sides of said rearward end of said plate and at either side of said integrated circuit means;

said circuit board being supported by said support walls.

12. The power plug of claim 11, wherein each said support wall is trifurcated having two outer fingers cooperating to form a ledge upon which said circuit board rests and having a center finger disposed between said two outer fingers, said center finger applying pressure to the edge and top of said circuit board to force said board downwardly against said ledge and sidewardly against said opposite support wall.

* * * * *